(No Model.) 2 Sheets—Sheet 1.

J. C. LESLIE.
SAFETY DEVICE FOR CUTTING MACHINES.

No. 580,874. Patented Apr. 20, 1897.

Witnesses
Geo. E. Frech.
James W. Bevans

Inventor
J. C. Leslie
Lehmann Pattison Nesbit
Assoc. Attorney

THE NORRIS PETERS CO., PHOTO-LITHO., WASHINGTON, D. C.

(No Model.) 2 Sheets—Sheet 2.

J. C. LESLIE.
SAFETY DEVICE FOR CUTTING MACHINES.

No. 580,874. Patented Apr. 20, 1897.

Witnesses
Geo. E. Frech
James W. Beran

Inventor
J. C. Leslie
by Lehman Pattison Nesbit
Assoc Attorneys

UNITED STATES PATENT OFFICE.

JOSEPH C. LESLIE, OF ST. ALBANS, VERMONT.

SAFETY DEVICE FOR CUTTING-MACHINES.

SPECIFICATION forming part of Letters Patent No. 580,874, dated April 20, 1897.

Application filed August 4, 1896. Serial No. 601,659. (No model.)

*To all whom it may concern:*

Be it known that I, JOSEPH C. LESLIE, a citizen of the United States, residing at St. Albans, in the county of Franklin and State of Vermont, have invented certain new and useful Improvements in Safety Devices for Cutting-Machines; and I do hereby declare the following to be a full, clear, and exact description of the invention, such as will enable others skilled in the art to which it appertains to make and use the same.

My invention relates to improvements in safety devices for cutting-machines, and it pertains to means so constructed and arranged as to instantly stop the feed mechanism at the will of the operator, as will be fully described hereinafter and especially referred to in the claims.

The object of my invention is to provide a safety means for instantly stopping the feed mechanism of a cutter at the will of the operator to prevent injury to the operator or to the machine by the passing therethrough of foreign matter, the same constructed to be conveniently operated by the operator by hand or foot.

Figure 1:
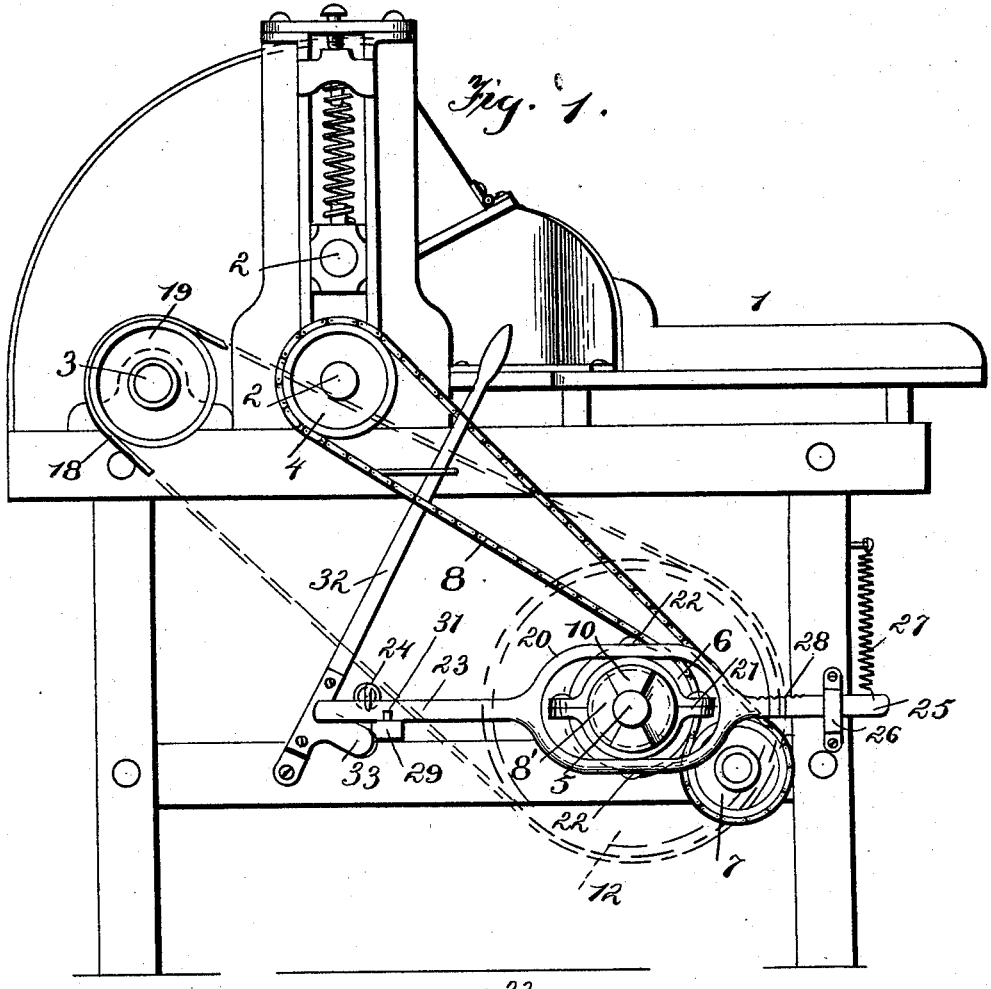
Figure 4:
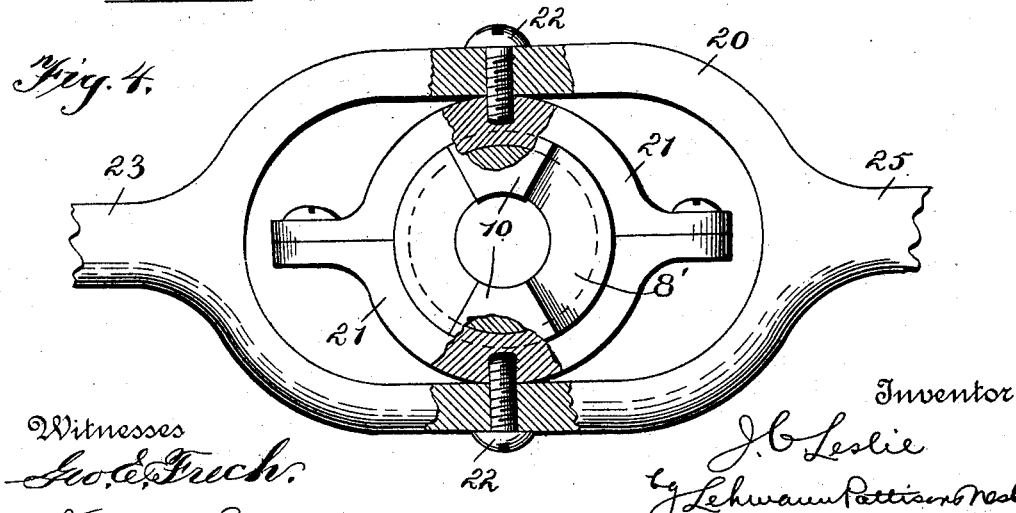
Figure 2:
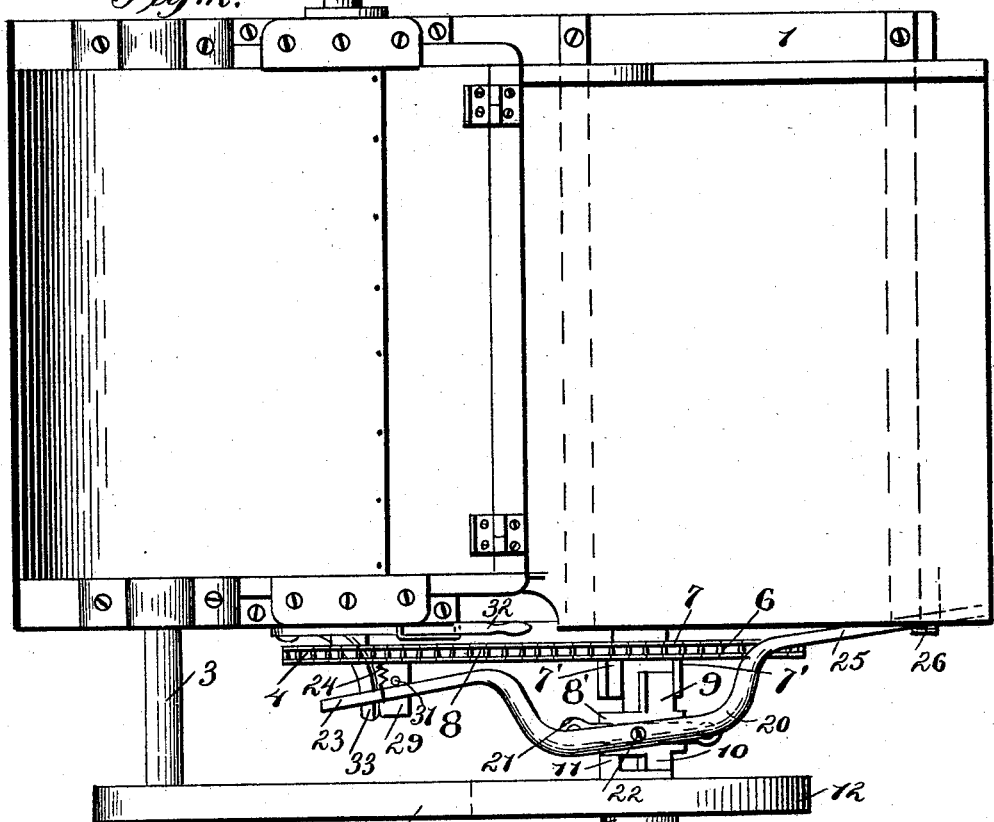
Figure 3:
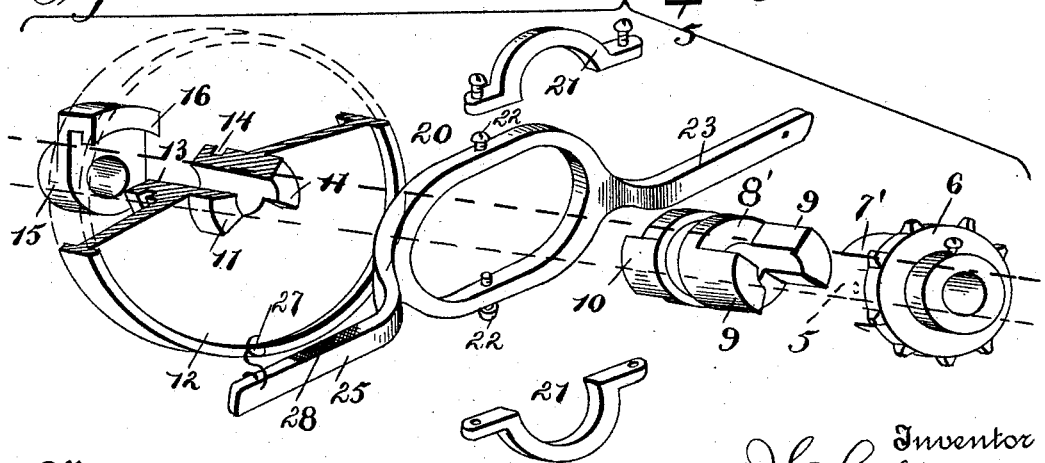

In the accompanying drawings, Figure 1 is a side elevation of a cutting-machine embodying my invention. Fig. 2 is a top plan view of the same. Fig. 3 is a detached view of the safety mechanism and the yoke for operating the same. Fig. 4 is a sectional view taken longitudinally of the yoke and through the center thereof, the clutch being shown in position therein.

In the accompanying drawings, 1 indicates the frame, 2 the feed-rollers, and 3 the cutter. Upon one end of the lower feed-roll is situated a sprocket-wheel 4 and upon the drive-shaft 5 the sprocket 6. Situated near the sprocket 6 is an idle-sprocket 7, and a sprocket-chain 8 passes around the idle-sprocket 7 and has one portion engage the sprocket 6 and then pass around the sprocket 4 of the lower feed-roller, as clearly shown. The sprocket 6 is fast upon the shaft 5 and provided with projections 7′, forming a connection with the collar 8′, having also projections 9, forming a clutch, as will be readily understood. The outer end of the collar is provided with projections 10, adapted to engage the projections 11 upon the inner side of the drive-wheel 12, the outer side of said drive-wheel being provided with a hub or collar 13, having a circumferential groove 14, and made fast upon the outer end of the shaft 5 is a collar 15. This collar 15 is provided with a lip 16, made L shape in cross-section to engage the circumferential groove 14 of the hub 13 of drive-wheel 12, as is clearly shown. This collar 15 serves to hold the drive-wheel against endwise movement upon the shaft 5, while at the same time the drive-wheel is loose upon the shaft and permitted to rotate freely independent thereof. A belt or sprocket-chain 18 meshes with the drive-wheel 12 and the band or sprocket wheel 19 of the cutter-shaft, the cutter-shaft receiving its power from the opposite end through the medium of a band or sprocket-chain, as will be readily understood.

A yoke or carrier 20 is provided with an auxiliary yoke 21, the latter receiving the clutch-collar and holding the clutch-collar against endwise movement independent of the auxiliary yoke or carrier, as clearly shown. The auxiliary yoke is pivoted within the main yoke 20 by means of the screws or bolts 22, so that the main yoke 20 has a pivotal movement independent of the auxiliary yoke 21. Projecting from one end of the yoke or carrier 20 is an arm 23, to which a spring 24 is attached, normally drawing the arm 23 inward. The opposite side of the yoke 20 is also provided with an arm 25, and this arm is held in a loop 26 and permitted by said loop to have an up-and-down movement. A spring 27 holds the arm normally upward, as shown, and the arm is provided with a rough portion 28 either for the hand or foot of the operator to depress that end of the yoke 20. By means of this construction the yoke or carrier 20 is journaled concentrically to the shaft 5 and upon the clutch-collar, as illustrated.

Projecting from the frame of the machine is a catch-casting 29, provided with a projection 31 upon its upper side, and by drawing outward upon the arm 23 of the yoke 20 it can be made to engage the outer side of the projection of the catch-casting 28 and thus sustained in its outward position against the tension of the spring 24.

A hand-lever 32 is pivoted at its lower end to the main frame 1 and provided near the pivotal point with a projecting tripping-arm 33, situated just below the projecting arm 23 of the yoke. From this description it will be seen that after the arm 23 of the yoke or carrier 20 is moved outward and engages the projection of the catch-casting for holding it normally outward the movement of the upper end of the hand-lever toward the cutter will lift the arm 23 and disengage it from the catch projection, permitting it to be instantly drawn inward by the spring 24, and this inward movement will carry the clutch out of engagement with the drive-wheel 12 and thus stop the feed-rollers, as will be readily understood from the preceding description.

If it is desired, the operator may disengage the arm 23 from the catch projection by depressing the arm at the opposite side of the yoke 20 against the tension of its spring, which oscillates the yoke 20 upon the clutch-collar and thus elevates the arm 23, disengaging it from the catch projection and permitting it to be drawn inward. So, also, if desired, the end of the arm 25 may be provided with a stirrup extending down to the floor, by means of which it can be depressed by the foot of the operator.

The main object of the invention is to provide convenient and ready means for stopping the feed mechanism of the machine instantly at the will of the operator, either by hand, foot, or knee, in the case of an accident to prevent injury to the person or to the machine.

Having thus fully described my invention, what I claim, and desire to secure by Letters Patent, is—

1. The combination of a cutter, a feed-roll, a drive-shaft, an operative connection between the feed-roll and the drive-shaft, a drive-wheel mounted loosely upon the said drive-shaft, a clutch mounted upon the shaft and adapted to engage the wheel and make it fast to said shaft, and to disconnect it therefrom by a movement upon said shaft, means for normally holding the clutch out of engagement with the drive-wheel, and a trip holding the clutch normally in engagement with the drive-wheel against the said holding means, for the purpose set forth.

2. The combination of the feed-roller, the shaft carrying a sprocket, a belt or chain passing around the sprocket and driving the feed-roller, a drive-wheel loose upon the shaft, a double clutch situated between the sprocket and the drive-wheel, and a yoke carrying the clutch and movable longitudinally of the shaft, a catch, a trip for the yoke and means normally drawing the yoke inward, substantially as described.

3. The combination of the feed-roller, a shaft, an operative connection between the shaft and the feed-roller, a drive-wheel upon the shaft, a clutch situated between the shaft and the drive-wheels, a yoke controlling the clutch, the clutch capable of rotation in relation to the yoke, a catch for holding the yoke in one position, a spring for drawing the yoke in the opposite direction, a catch for the yoke, a lever adapted to trip the yoke and release it from the catch, substantially as described.

4. In a safety device, the combination of a shaft, a drive-wheel loose thereon, a clutch between the shaft and the drive-wheel, a yoke controlling the clutch, and movable endwise the shaft, a catch for the yoke, a means for holding the yoke in engagement with the catch, and a means for tripping the yoke, substantially as described.

5. In a safety device, the combination of a shaft, a drive-wheel loose upon the shaft, a clutch between the shaft and the drive-wheel, a yoke controlling the clutch and the clutch rotatable on the yoke, the yoke provided with oppositely-extending arms, a catch adapted to hold the yoke, and a means for drawing the yoke against the catch, whereby the depression of the arm opposite the catch will release the yoke from the catch, substantially as described.

6. The combination in a safety device, of a shaft, a drive-wheel thereon, a clutch situated between the shaft and the drive-wheel, a yoke controlling the clutch and the clutch rotatable on the yoke, the yoke having oppositely-extending arms, a catch for the yoke, a means for drawing the yoke in one direction against the catch, a lever for tripping the arm of the catch, the opposite end of the arm adapted to be depressed and so to release it from the catch whereby either the lever or the arm may be used as a releasing means, substantially as described.

7. The combination of a cutter, a feed-roll, the drive-shaft, an operative connection between the feed-roll and the drive-shaft, a drive-wheel mounted loosely upon the said drive-shaft, a clutch upon the shaft adapted to engage the drive-wheel and make it fast upon said shaft, a carrier for moving the clutch, a means for holding the carrier normally toward the drive-wheel and the clutch normally in contact therewith, and the trip engaging and holding the carrier normally toward the drive-wheel and the clutch in engagement therewith, whereby a releasing of the trip causes the clutch to disengage the drive-wheel, substantially as described.

In testimony whereof I do affix my signature in presence of two witnesses.

JOSEPH C. LESLIE.

Witnesses:
 GILBERT A. DOW,
 CHARLES E. ALLEN.